United States Patent [19]

Harvey

[11] 4,050,295
[45] Sept. 27, 1977

[54] DIGITAL MEASURING SYSTEM FOR ENGINE FUEL PERFORMANCE

[76] Inventor: Norman L. Harvey, 381 Ocean Ave., Marblehead, Mass. 01945

[21] Appl. No.: 612,682

[22] Filed: Sept. 12, 1975

[51] Int. Cl.² .............................................. G01F 9/00
[52] U.S. Cl. ...................................... 73/114; 364/442
[58] Field of Search ........................ 73/114, 113, 255; 235/150.21

[56] References Cited

U.S. PATENT DOCUMENTS

| 2,776,568 | 1/1957 | Ward et al. | 73/255 |
| 3,549,868 | 12/1970 | Watson | 73/114 X |
| 3,772,915 | 11/1973 | Stamler | 73/113 X |
| 3,908,451 | 9/1975 | Walker et al. | 73/114 |

FOREIGN PATENT DOCUMENTS

2,017,141  10/1971  Germany ............................ 73/114

Primary Examiner—Jerry W. Myracle
Attorney, Agent, or Firm—Thomas C. Stover, Jr.

[57] ABSTRACT

Method and apparatus for measuring engine performance with respect to fuel consumption either in miles per gallon or gallons per hour is provided. Such performance, in engines either in vehicles or stationary machines, is measured by a digital counting, measuring and calculating system. Fuel flow rate and distance traveled, or elapsed time units are converted respectively to streams of electric pulses which are counted and the ratio thereof calculated and the results transmitted to a display. Current and average performance characteristics of an engine are displayed. For example, the current and average miles per gallon of a motor vehicle are displayed to the operator.

23 Claims, 9 Drawing Figures

DIGITAL MEASURING SYSTEM FOR ENGINE FUEL PERFORMANCE

FIELD OF THE INVENTION

This invention relates to the measurement, calculation, and display of both current and cumulative average fuel-utilizing performance of equipment powered by engines.

BACKGROUND OF THE INVENTION

Until recently the only operating parameters of the automobile of any real interest to the typical motorist have been his instantaneous speed, miles traveled, and an indication of the essential quantities of fuel supply, engine temperature, and oil pressure. For a great many years, the car manufacturers have made it a near universal practice to supply only the instrumentation to measure and display these quantities in their products.

The advent of a world wide shortage of petroleum fuels, however, coupled with the resulting large increase in gasoline prices, has made the motoring public more conscious of the mileage performance of the automobile. Fuel conservation has become so much a matter of national concern that the Congress has enacted legislation designed to encourage the manufacture of cars with a much better fuel-mileage performance than that previously considered acceptable.

The individual motorist is strongly encouraged to operate his car in a fuel-conserving manner by driving at only moderate speeds, avoiding quick acceleration, etc. He has no convenient way to determine what mileage performance his efforts are achieving, however, and can only resort to the procedure of maintaining a written record of gasoline purchases and odometer readings, and then calculate, from time to time, the average gas-mileage over some interval of time. The procedure is so laborious that most people simply don't bother, particularly since it provides no detailed facts concerning the effectiveness of specific conservation measures.

Clearly the energy crisis has created a situation where the measurement and display of both instantaneous or current and long term average operating fuel economy are fully as important as the traditional measurement of speed and miles travelled. The prior art of instrumentation for the measurement of gas-mileage has serious inherent limitations, however.

Older methods typically involve inserting a sensing device into the fuel supply line that will produce an electrical voltage generally proportional to the time rate of fuel flow, inserting a second device into the speedometer cabling to produce a second voltage generally proportional to the car speed, electrical means to divide the second voltage by the first, and a meter to display the instantaneous value of the quotient. These systems provide no means for integrating fuel flow over a period of time, and cannot provide a measure of fuel-mileage over a trip, for example.

The measurement of fuel flow rate over the range of speed and acceleration conditions typical of normal driving, is particularly difficult to do without adversely affecting car performance, and imposes severe limitations on the accuracy of these older systems. The fuel gauging device most commonly employed in prior art systems uses a float placed as a partial restriction in the fuel stream, and linked mechanically or magnetically to a variable resistor. A voltage generally proportional to float displacement is produced across two terminals of the variable resistor. The force required to overcome friction in the linkage system with sufficient margin to permit reliable measurement of fuel flow, particularly at low consumption levels, is a significant fraction of the kinetic energy of the fuel stream. Moreover, the mass of a practical float and linkage system is large enough so that the acceleration that can be achieved with the limited force available is marginally small. These inherent characteristics of these flow devices tend to adversely affect engine performance.

Another fuel flow measuring device based on prior art, employs a sphere positioned in a vertical, tapered section of the fuel line. The fuel stream pushes the sphere upward in the widening portion of the tapered section, the vertical position depending ideally upon the rate of fuel flow. The sphere, being opaque, intercepts a proportionate amount of a light beam that impinges upon a photo-conductive element. A voltage proportional to vehicle speed is applied to the photo-conductive element, said voltage being derived from a small electrical generator inserted in the speedometer cable system. This flow meter has the advantage of eliminating the mechanical linkages of float type devices and their attendant friction, but the output is only roughly proportional to flow rate, and the ability of the system to resolve small differences in flow rate is very limited. These limitations are inherent, because the sphere cannot be constrained to move precisely along the axis of the tapered section of the fuel line, because the turbulent fuel flow above the sphere also affects the position, because the cross section of the light beam is not of uniform density in any practical optical system and because of non-linearities in the response of the photo-conductive element.

Although the speed responsive sensor in prior art systems is not subject to the same limitations of accuracy as is the fuel sensor, there are definite limits on the linearity of output voltage of practical devices over the range of speeds which must be measured. These various prior art systems, depending as they do upon sensing fuel rate and speed with devices that produce an output supposedly proportional to the quantity which they measure, have severe limitations of accuracy and resolution over the extreme range of conditions under which the automobile typically operates.

The present invention provides a system for the measurement, calculation, and display of both instantaneous and cumulative average fuel utilizing performance in engines including fuel powered vehicles. Both fuel flow and time of operation or distance travelled are sensed by digital methods, counts are accumulated, either for brief time intervals for essentially current or instantaneous information, or over longer intervals for the calculation of trip averages. Calculations are performed by solid state devices incorporated into integrated circuits. The resulting performance values are preferably displayed digitally as numbers, although conversion to a meter display is possible.

SUMMARY

There has now been developed a fuel consumption measuring apparatus for fuel powered vehicles comprising; a distance travelled sensor connected to the kinetic system for said vehicle which produces electric pulses, the number thereof in proportion to the distance travelled by said vehicle; a fuel flow sensor connected to the fuel system for said vehicle which produces electric signals, the number thereof in proportion to the per unit fuel flow therein; counting means to count separately the distance pulses and the fuel flow pulses over selected periods and calculating means to compute the ratio of the two counts for a selected period to obtain the fuel consumption per distance rate for said vehicle.

There has also been developed a fuel consumption measuring apparatus for engines and methods therefor as disclosed and claimed herein.

DESCRIPTION

The invention will become more apparent from the detailed specification and drawings in which.

Figure 1:
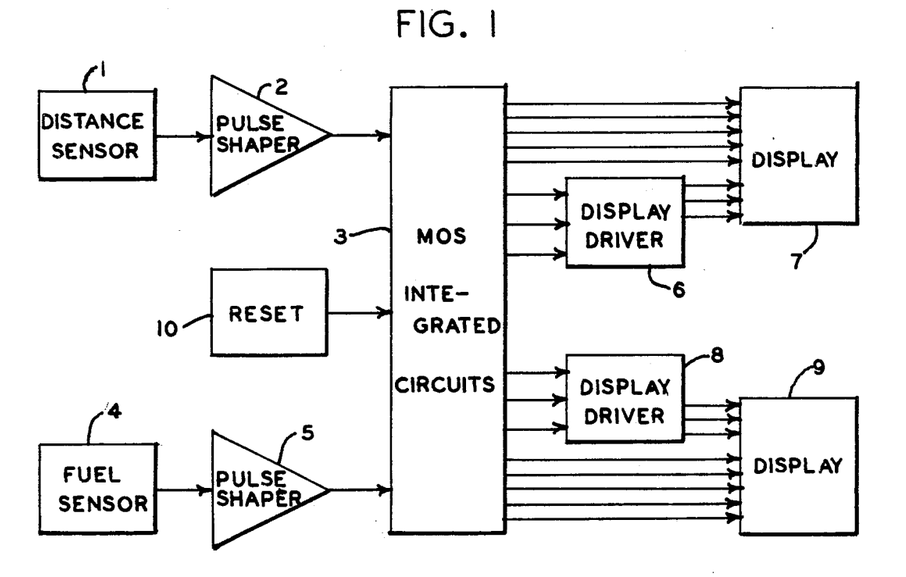
FIG. 1 is a block schematic diagram of the digital fuel-mileage system in which large scale integration of the major portion of the electronic circuits is employed for economical production.

Referring now to the drawings, distance sensor 1, shown in FIG. 1, outputs an electrical pulse at specific increments of distance travelled. This sensor 1 can be, in principle, any digital device responsive to the rotations of one of the car wheels, or of any of the gears or shafts coupled to the transmission and drive system, or to the rotation of the flexible cabling system universally provided between the car's transmission and the speedometer, all of which is referred to herein as the kinetic system for a vehicle. A preferred embodiment of such a sensor will be described shortly in connection with FIG. 4.

The electrical pulses output from distance sensor 1 typically will vary in length over the wide range of car speeds during which measurements are made, and so they are sliced and sharpened by well known methods in pulse shaper 2. They are then introduced at one input port to a metal-oxide-semiconductor (MOS) large scale integrated circuit 3 (also known as an MOS Processor).

Fuel flow is sensed by digital fuel sensor 4 inserted into the fuel supply line. A preferred embodiment of such a sensor will be described shortly in connection with FIGS. 2 and 3 in which a small sphere in the fuel stream periodically intercepts a light beam and thereby periodically produces an electrical pulse. The train of electrical pulses, each one representing one unit of flow by fuel sensor 4, are shaped by pulse shaper 5 in a manner similar to the shaping of the distance pulses. The shaped fuel pulses are introduced at a second input port to MOS integrated circuit 3.

MOS integrated circuit 3 is fabricated by the same modern techniques used to fabricate micro-processors and other substantial segments of computers on a single chip or substrate of semi-conductor material. It performs most of the functions of the more detailed block schematic diagram depicted in FIG. 5, which will be described later in this specification. In order to first gain an understanding of the overall functioning of the system, MOS integrated circuit 3 will be described in terms of the overall functions it performs, and the more detailed description will be given in connection with FIG. 5.

The series of pulses coming from pulse shaper 5, representing the responses of fuel sensor 4 to the flow of fuel, is sent along two different paths after it enters MOS integrated circuit 3. Along a first path, every one pulse out of some number selected to fit each particular application, is used to trigger or initiate the calculations of instantaneous miles per gallon. For example, assume that each pulse initiates the calculation sequence. A similar train of pulses, representing the distance sensing, has been coming from pulse shaper 2, and is also being directed along two different paths after it enters MOS integrated circuit 3. The pulses coming along a first path are accumulated in an electronic counter within MOS integrated circuit 3. Each time a calculation is initiated by one of the fuel count pulses, the number accumulated in the distance counter is gated into a calculating segment where it is divided by one and multiplied by a constant to convert the result to miles per gallon. The distance counter is then reset to zero to repeat the process. Examples of typical values given later in this specification will show that this calculation cycle typically will occur in a period of the order of one second, presenting an essentially instantaneous and continuous result to the driver of the car.

Control signals for a three-digit display are then transmitted to display driver 6, which provides drive power to display 7. The results of the fuel-mileage calculation described above are transmitted to display 7, providing the driver with a continuous display of essentially instantaneous gas mileage, updated at time intervals of the order of one second.

Figure 2:
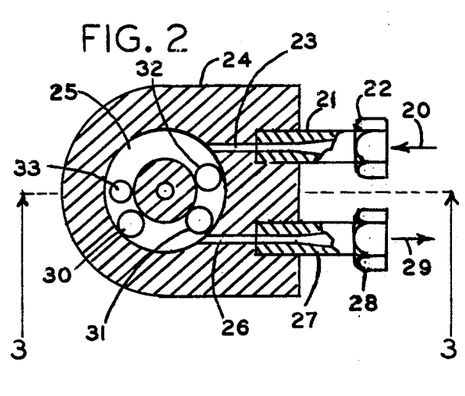
FIG. 2 is a sectional elevation view of a fuel sensor embodying the present invention.

Gas mileage, accumulated and averaged over a "trip," is calculated in a similar manner, using the two trains of pulses from the two sensors, each moving over its second path in MOS integrated circuit 3. A counter is provided to accumulate the pulses output from fuel sensor 4. The system can be pre-set to calculate an accumulated average miles per gallon by triggering at, say, every 100 fuel pulses. This will initiate the calculation dividing the number stored in the distance counter by the number stored in the fuel counter, and multiplying by the constant to produce average miles per gallon. A three-digit display is activated using display driver 8 and display 9 in a manner similar to that for the instantaneous display already described. A new trip count can be initiated simply by pressing manual reset 10. A device particularly well suited for the digital sensing of fuel flow is illustrated in FIG. 2. To help understand the basic functioning of this sensor, imagine first, somehow placing a series of opaque spheres at regular intervals, say every inch in the fuel line. These spheres will be made of a material of the same density as the fuel, and will be carefully sized so as to be of a very slightly smaller diameter than the interior diameter of the fuel line. With negligible friction from their movement along the fuel line and being of neutral buoyancy, it can be seen that the fuel would, in effect, be maintained in uniform length compartments, separated by the spheres, with no significant pressure differential between adjacent compartments. Now if a section of the fuel line was transparent, and a light source and photo diode were placed on opposite sides of the line, the interruptions of the light beam by each sphere in turn could generate a train of electrical pulses that would represent a count of the flow of compartments of fuel past the sensing point.

The imaginary fuel sensing system just described would require, obviously, some means to introduce the spheres at regular intervals into the fuel stream, and further means to remove them after they had passed the counter, but before reaching the carburetor. The fuel sensor depicted in FIG. 2 is a practical embodiment of these concepts. Fuel enters at inlet 20, flows through tapered entrance tube 21, and flows with an increased velocity through the smaller diameter channel 23 of body 24 into annular channel 25. Annular channel 25 is doughnut shaped with a circular cross section, and is accurately machined to a uniform diameter and with smooth wall surfaces.

After flowing in a counter-clockwise direction around annular channel 25, the fuel exits through channel 26 into tapered exit tube 27, and exits the sensor at 29. Entrance tube 21 and exit tube 27 are both flanged and provided with nuts 22 and 28, respectively, so that the sensor can be inserted in the fuel supply line between the fuel pump and the carburetor.

Three opaque, neutral buoyancy spheres, 30, 31 and 32 are positioned in annular channel 25. At the positions shown in FIG. 2, sphere 30 is moving in a counter-clockwise direction with the fuel stream, and spheres 31 and 32 are momentarily stationary. As sphere 30 passes the exit into channel 26, it pushes sphere 31 forward, and this sphere in turn pushes sphere 32 by pushing the small slug of fuel trapped between them. Sphere 30 comes to rest, having left the moving fuel stream, but sphere 32 has been pushed into the fuel jet stream emerging from channel 23, and it now moves around annular channel 25 with the moving fuel stream. The process continues to repeat itself with each sphere, in turn, entering the fuel stream, moving around the annular channel 25, leaving the fuel stream as the fuel exits at channel 26, and giving the push that brings the next sphere into the moving position.

As each sphere makes its circuit of the annular channel, it passes through and interrupts a light beam originating from light source 33 and shining up through annular channel 25. A photo diode (not shown in FIG. 2) is mounted above the annular channel and opposite light source 33. As each sphere interrupts the light beam, an electrical pulse appears at the terminals of the photo diode, and is used by the system as previously described to give a count of fuel consumption.

Figure 3:
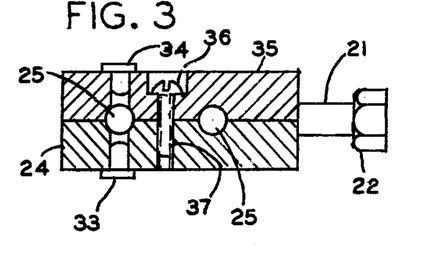
FIG. 3 is a sectional elevation view of the sensor of FIG. 2 taken on line 3—3 looking in the direction of the arrows.

A cross sectional view of the fuel sensor of FIG. 2 is illustrated in FIG. 3. Entrance tube 21 with associated nut 22 is shown therein. Annular channel 25 appears as two circular cross sections in this view. Spheres 30, 31 and 32 are not shown. Light source 33 is shown mounted in an opening in body 24. Photo diode 34 is positioned opposite in a similar opening in upper body 35. Upper body 35 and body 24 are held firmly together by screw 36 threaded into tapped hole 37 in body 24. A suitable cement is used also to make the seal between the upper and lower bodies fuel tight.

Figure 4:
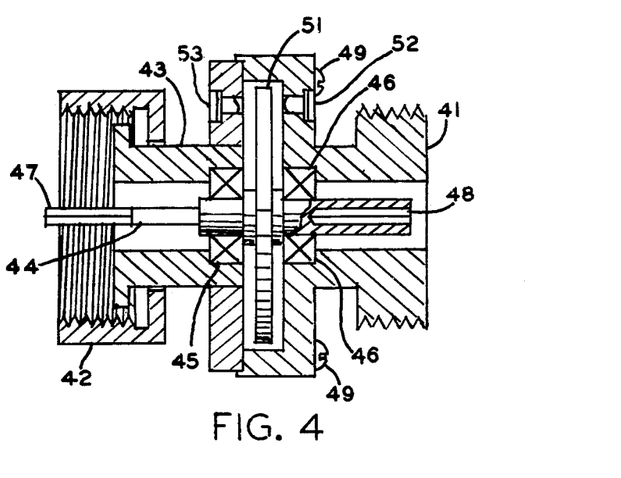
FIG. 4 is a sectional elevation view of a distance sensor, embodying the present invention.
Figures 6, 7, 8:
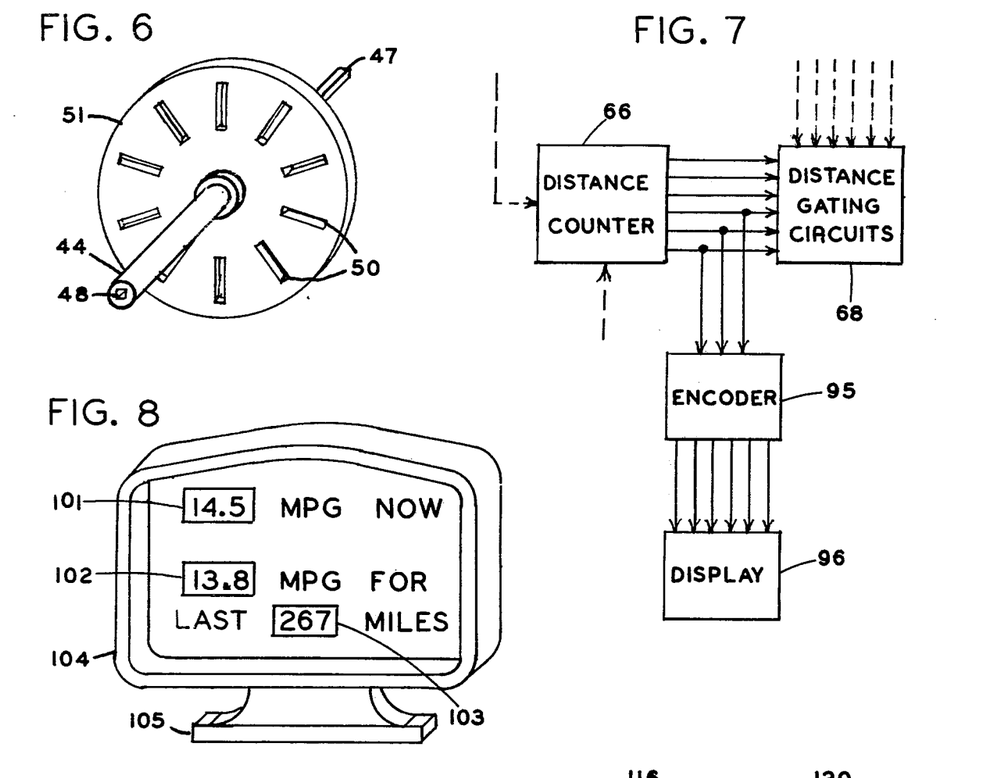
FIG. 6 is an isometric view of a component of the apparatus embodying the invention shown in FIG. 4.
FIG. 7 is a block schematic diagram of further circuitry relative to the display of miles travelled, added to the circuitry shown in FIG. 5, embodying the invention.
FIG. 8 is an isometric view of a display apparatus of the digital fuel-mileage system embodying the invention.

A preferred embodiment of a distance sensor, designed to be inserted at either the speedometer or transmission end of the speedometer, is depicted in FIG. 4. Sensor body 41 at one end, and nut 42 captive behind a flanged portion of sensor body 43 at the other end, provide means to insert this device into the speedometer cabling system. A coaxial shaft 44 rotates in bearings 45 and 46, and as shown in FIGS. 4 and 6, is provided with a rectangular stem 47 at one end, and a rectangular socket 48 at the other, to mate with the corresponding shafts of the commonly used speedometer cabling systems. Machine screws 49 spaced around the periphery of sensor body 41, and enaging tapped holes in sensor body 43, hold the assembly together.

A disk 51, also in FIG. 6, having several evenly spaced radial apertures 50 cut into it, is pressed onto shaft 44. A light source 52 and a photo diode 53 are mounted opposite one another in the two body halves respectively so that light from source 52 will reach photo diode 53 whenever one of the apertures is between them, but will be interrupted at other angular positions of disk 51. It is obvious, then, that a series of electrical pulses will be generated by the sensor as the shaft rotates, each pulse coming after the vehicle has travelled some increment of distance depending upon the constants of the system.

In block schematic form the functions of the electronic circuits described in connection with FIG. 1 are shown in more detail in FIG. 5. Distance sensor 61 is a device, preferably as depicted in FIG. 4, which outputs an electrical pulse whenever some specific increment of distance has been travelled. The pulses from this sensor are then sharpened and shaped in pulse shaper 63, and passed along two paths to a first distance counter 65 employed in the measurement of instantaneous quantities, and also to a second (average) distance counter 66 employed in the measurement of trip averages.

The instantaneous distance count is gated through gating circuits 67 to interface circuits 69, and then to calculator chip 71. Interface circuits 69 function to convert from the transistor-transistor logic (TTL) of the preceeding circuits to the MOS levels of the calculator chip 71. In the embodiment of my invention here described, three decimal digits are assigned to the distance count carried through these circuits just described. The gating function of gating circuits 67 is controlled in time by instant mpg seqrencer 73.

Fuel consumption likewise is sensed by fuel sensor 62, preferably a device as described in connection with FIGS. 2 and 3, and outputs a train of electrical pulses representing a count of units of volume of gas consumed. These pulses are shaped in pulse shaper 64, and travel down two branched paths to sequence control 77 and to fuel counter 76. Sequence control 77 responds to the input of a fuel count pulse by functioning to send an initiating pulse to instant mpg sequencer 73 to start the process of calculating and displaying an updated value of instantaneous fuel-mileage. Instant mpg sequencer 73 then proceeds through the following nine steps.

1. Commands display driver 79 to disable display 81, and gates gating circuit 67 to gate the most significant distance digit through interface circuits 69 to calculator chip 71.

2. Gates second most significant digit through gating circuits 67.

3. Enters the "divide" function through interface circuits 69 to calculator chip 71.

4, 5 & 6. Enters a fixed divisor constant through interface circuits 69 to calculator chip 71. The value of the constant is established by the characteristics of the two sensors.

7. Enters the "equals" function through interface circuits 69 to calculator chip 71.

8. Disables the sequence control 77.

9. Enables the updated fuel-mileage display on display 81 through display driver 79.

During this process a clocking pulse is supplied to instant mpg sequencer 73 from calculator chip 71. Display driver 79 powers a 3-digit display on display 81, which receives signals representing the calculated result from calculator chip 71.

Figure 5:
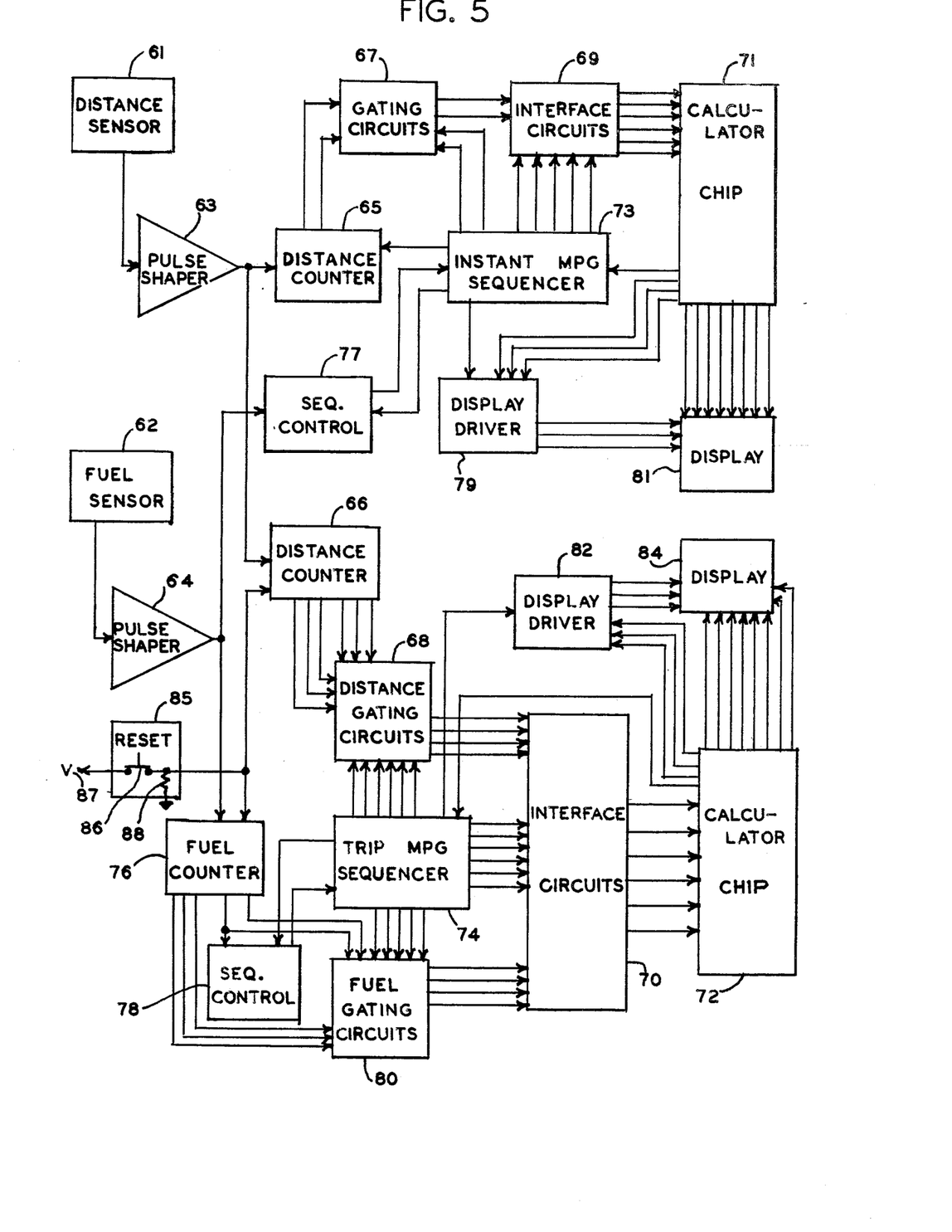
FIG. 5 is another block schematic diagram of the circuitry as a part of the fuel-mileage system embodying the invention.

The remaining portions of the electronic circuitry shown in FIG. 5 function in a generally similar manner to calculate and display the average fuel-mileage during a trip or over whatever distance or time interval the driver elects to have this measurement made.

The system shown in FIG. 5 is configured to count up to a million distance pulses in distance counter 66 and up to 100,000 fuel pulses in fuel counter 76. The distance pulses are gated through distance gating circuits 68, controlled by trip mpg sequencer 74, to the interface circuits 70, and then in modified form on to calculator chip 72. One of the decade levels of the fuel count can be selected to trigger sequence control 78 by connection of the sequence control to one of the output lines from fuel counter 76. By this means the average fuel-mileage can be calculated every 100 fuel counts, for example or for any other desired number represented by one of the output lines.

The output of the fuel counter 76 is gated through fuel gating circuits 80 in the same manner described earlier for the gating of the distance counts. Fuel gating circuits 80 are controlled by trip mpg sequencer 74. Gated fuel counter outputs are input to the interface circuits 70 for interfacing to the MOS circuitry of calculator chip 72. Calculated results are input to display 84, which is driven by display driver 82, these two circuit elements functioning in the same manner as described previously for the corresponding elements in the instantaneous fuel-mileage portion of the system.

A manual reset 85 provides the driver with means to set both distance counter 66 and fuel counter 76 to zero, and to thereby determine the start of the procedure of accumulating counts of both quantities for a trip. Reset is accomplished by manually closing switch 86 so as to connect an appropriate external voltage level 87 to both counters. A resistor 88 establishes a definite level of impedance for this reset circuit.

The specific execution of the functions described above in calculating and displaying a long term or trip average, is through a process of 19 events managed by trip mpg sequencer 74 as follows:

1. Trip mpg sequencer 74 commands display driver 82 to disable the display 84, and gates the most significant distance digit through distance gating circuits 68.

2. Second most significant digit is gated.

3. Third most significant digit is gated.

4. Fourth most significant digit is gated.

5. Fifth most significant digit is gated.

6. Sixth most significant digit is gated.

7. The "divide" function is entered into calculator chip 72 through interface circuits 70.

8. Most significant fuel count digit is gated through fuel gating circuits 80.

9. Second most significant fuel count digit is gated.

10. Third most significant digit is gated.

11. Fourth most significant digit is gated.

12. Fifth most significant digit is gated.

13. The "divide" function is entered in calculator chip 72.

14, 15 & 16. A fixed divisor is entered in calculator chip 72 through interface circuits 70. The value depends upon the specific system device parameters.

17. The "equals" function is entered in calculator chip 72.

18. Sequence control 72 is disabled.

19. Display driver 82 and display 84 is enabled.

An addition which can be made to the system schematic shown in FIG. 5 is an electrical trip odometer, which may be displayed either independently or in combination with the accumulated average miles per gallon. Distance counter 66 functions as previously described in connection with FIG. 5 to accumulate a count of electrical impulses proportional to the distance travelled since the counter was last reset. This count is input to distance gating circuits 66, also as previously described. The output of the three most significant decimal digits from distance counter 66 is directed also along a second path to encoder 95. Encoder 95 converts the decimal count to a seven segment per character code, by well known methods, and drives display 96, showing the whole number of miles travelled since last reset. In the embodiment here illustrated, up to 999 miles may be so displayed.

Figure 9:
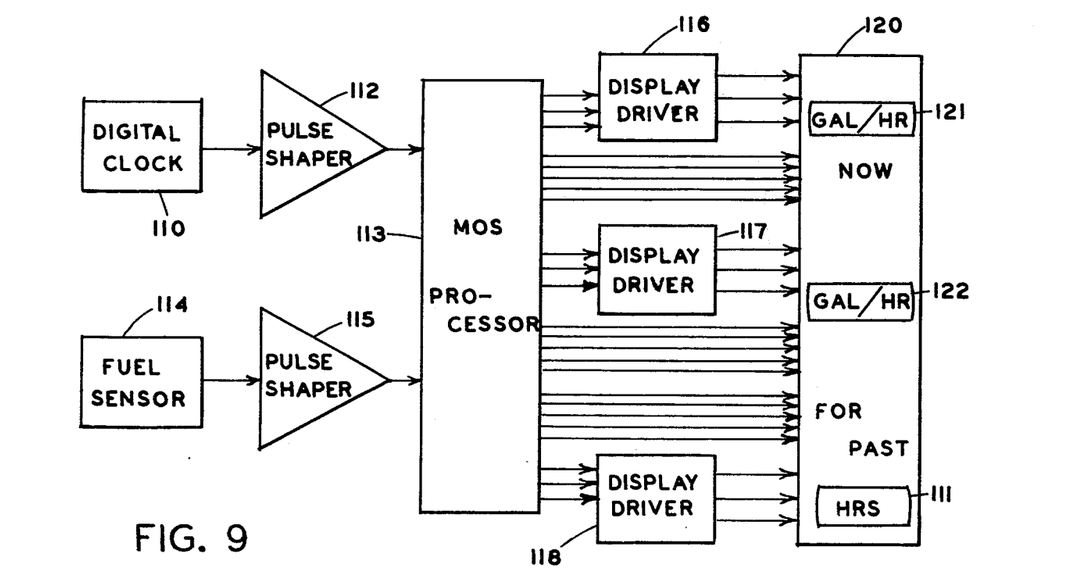
FIG. 9 is a block schematic diagram of a system of circuitry in which elapsed time is measured instead of distance, and performance is calculated in gallons of fuel consumed per hour as a further embodiment of the present invention.

An integrated display, showing the instantaneous fuel mileage of display 81 (from FIG. 5) in one window 101, the accumulated average fuel mileage of display 84 (also FIG. 5) in a second window 102, and the accumulated distance of display 96 (FIG. 7) in a third window 103, is shown in FIG. 8. All three of these numerical displays are constantly being renewed or updated as the system functions as previously described. The display device of FIG. 8 is shown as a small case 104 carrying a flange 105 suitable for mounting on top of the dash board of an automobile, but of course could equally well be a panel instrument. Another embodiment of the invention, configured for applications, such as with aircraft or stationary engines, where fuel consumption relative to elapsed time is more appropriate than is consumption relative to distance, is shown in FIG. 9. This system is very similar to the system depicted in FIG. 1, except that a digital clock 110 replaces the distance sensor, and a display of elapsed or operating time 111 is added.

The pulses output by digital clock 110 are amplified and shaped in pulse shaper 112, and then are input to MOS processor 113. Fuel sensor 114 preferably is a device as previously described in connection with FIGS. 2 and 3. It outputs a pulse to pulse shaper 115, and the amplified and sharpened pulses are input to MOS processor 113. This processor, fabricated by the newly standard techniques of large scale circuit integration, performs the counting, gating, sequencing, and calculating functions as previously described in connection with FIG. 5, except, of course, that the calculation made is of gallons per hour, rather than miles per gallon. Each calculation is initiated, exactly as in the system of FIG. 5, by each output pulse of the fuel sensor 114 for the instantaneous fuel rate usage, and by some conveniently preset number of pulses (say 100) from fuel sensor 114 for the accumulated average consumption rate. In each calculation the fuel count is divided by the time count.

MOS processor 113 actuates display driver 116 for the instantaneous consumption figure, driver 117 for the accumulated average consumption, and driver 118 for the operating hours. Each drives the related displays 121, 122, and 111 respectively in an integrated display device 120. The displays are further enabled directly from MOS processor 113 in a manner well known to those skilled in the art.

In another embodiment within the scope of the present invention, fuel flow can be sensed by other types of sensing devices, for example by small impeller or turbine flow meters. In such devices, rotating paddle wheels or a small turbine rotor carrying deflecting blades is located in the fuel stream and is caused to rotate by the flowing fuel at a rate generally proportional to the rate of fuel flow. If a portion of the sensor housing is transparent, and if the paddles or blades intercept a light beam at certain rotational positions, a photocell pickup device will output electrical signals at a rate proportional to the rate of rotation, and thereby proportional to the rate of fuel flow.

Alternatively, the rotating blades of a sensor of this type can be made of a magnetically permeable material, such as iron, and complete a magnetic circuit loop positioned otherwise around the exterior of the sensor. This magnetic circuit can be energized either by including a permanent magnet section within it or by the flow of electric current through a coil wound around one section of the magnetic circuit. The rotation of the sensor paddles or blades will vary the reluctance of the magnetic path, and can be detected by a second sensing coil wound around a section of the magnetic circuit or by the varying impedance that an energizing coil presents to the source of electrical current.

The same principle of magnetic coupling could replace the optical coupling method in a distance sensor. For example, the apertured disk shown in FIG. 6 can be replaced by an iron wheel carrying a number of symmetrically placed teeth. The photo diode and light source can be replaced by an external magnetic yoke so positioned that the teeth of the wheel rotate through the gap in the magnetic circuit. As they pass through this gap, the reluctance of the magnetic path varys, and can be sensed as described above for the fuel sensor.

Photo electric cells are employed in the sensor of the present invention and include photo diodes, photo tubes and photo transistors.

The apertured disc 51, shown in FIGS. 4 and 6 can be replaced with a multi vaned member, a gear or other rotatable member with apertures therein. The apertures can have various shapes.

The sensor components can be of metal or durable plastic and preferably are of plastic, eg. polyolefins, including polyethylene, polystyrene, and the like.

The accuracy and resolution improvements of my invention over prior art system are best illustrated by examples of typical operation.

EXAMPLE I.

Consider the measurement of fuel-mileage performance for a car that delivers 15 miles per gallon at normal driving speeds. A fuel sensor of the type described previously in this specification can readily produce 1,000 pulses per gallon of fuel flowing through it. A distancce sensor of the type also described will produce 8,000 pulses per mile travelled.

$$\text{Fuel pulses/mile} = \frac{1000 \text{ pulses/gal}}{15 \text{ miles/gal}} = 66.7 \text{ pulses/mile}$$

$$\text{Distance pulses/fuel interval} = \frac{8000 \text{ pulses/mi}}{66.7 \text{ pulses/mi}} = 120$$

Under these conditions the system can resolve about 120 levels of fuel-mileage. This is about 0.83%, or slightly more than 0.1 mi/gal.

At a speed of 30 mi/hr, and a mileage of 15 mi/gal, $$\text{Fuel consumption} = \frac{30 \text{ mi/hr}}{15 \text{ mi/gal}} = 2 \text{ gal/hr}$$

$$\text{Fuel pulse rate} = \frac{2 \text{ gal/hr} \times 1000 \text{ pulses/gal}}{3600 \text{ sec/hr}} = 0.55 \text{ pulses/sec}$$

$$\text{Display time} = \frac{1}{0.55} = 1.8 \text{ seconds}$$

If the same mileage were achieved at a speed of 60 mi/hr, the display time would be halved to 0.9 seconds. At higher speeds, fuel economy decreases, fuel consumption to maintain speed increases, fuel count rate increases, and the display time tends to become shorter. At the opposite extreme, a standing car with idling motor is, obviously, realizing 0 mi/gal. An idling Volkswagon will consume about 0.20 gal/hr. At 1,000 fuel counts (pulses) per gallon, the system of my invention will then produce 200 pulses/hr, or one pulse each 18 seconds. Every 18 seconds the accumulated distance count (zero) would be divided by one and multiplied by the conversion constant, producing a "00.0" mi/gal on display 81.

It is to be understood that the pulse rates of 1,000 pulses/gal and 8,000 pulses/mile for the fuel and distance sensors respectively, are given for illustrative purposes only, and are in no sense indicative of system or device limitations. Moreover, sensing devices based on other principles, such as turbine or impeller type flow meters with electrical or magnetic coupling to a counter, and others, may be employed in the system of my invention. Also other variations of the electronic digital circuits will occur to those skilled in the art, but such variations of detail are considered to be within the scope of my invention.

What is claimed is:

1. A fuel consumption measuring apparatus for fuel powered vehicles comprising; a distance traveled sensor connected to the kinetic system for said vehicle which produces electric pulses, the number thereof in proportion to the distance traveled by said vehicle; a fuel flow sensor connected to the fuel system for said vehicle which produces electric pulses, the number thereof in proportion to the per unit fuel flow therein; counting means to count separately the distance pulses and the fuel flow pulses over a selected time period and calculating means to compute the ratio of the two counts for a selected time period to obtain the fuel consumption per distance rate for said vehicle.

2. The apparatus of claim 1 wherein the distance traveled sensor produces an electric pulse at regular increments of distance traveled and said fuel flow sensor produces an electric pulse for regular increments of fuel flow.

3. The apparatus of claim 1 having means to measure the fuel consumption in miles per gallon.

4. The apparatus of claim 1 having means for periodically restarting the counting means at zero and means to periodically activate the calculating means to provide at intervals, the current fuel consumption rate of said vehicle.

5. The apparatus of claim 1 having means for continuously accumulating the distance pulses and the fuel flow pulses and means for activating the calculating means at selected periods to provide the then average fuel consumption of said vehicle.

6. The apparatus of claim 1 having display means to depict the calculated fuel consumption per distance rate for said vehicle.

7. The apparatus of claim 1 wherein said fuel flow sensor comprises, a housing containing a fuel flow channel, a plurality of substantially opaque annular bodies positioned in said channel, said bodies being sized to fit within said channel with close clearance, said bodies having about the same density as said fuel, at least a section of said channel being translucent; a light source mounted on one side of the channel section and a photoelectric cell being positioned on the other side of said channel aligned to receive a light beam from said light source such that the fuel flow pushes said bodies through said light beam to interrupt it and activate said cell to generate a plurality of electric pulses to record the per unit amount of fuel flow in said channel.

8. The apparatus of claim 7 wherein said channel is shaped in a closed ring with a fuel inlet and a fuel outlet communicating therewith, which inlet and outlet are of smaller cross-sectional size than said bodies such that the fuel flow pushes said bodies around said ring and interrupts said light beam.

9. The apparatus of claim 8 wherein said annular bodies are spheres.

10. The apparatus of claim 8 wherein said channel is circular in cross-section.

11. The apparatus of claim 1 having a first pulse shaper for slicing and sharpening the first electric pulses transmitted from the distance traveled sensor and a second pulse shaper for slicing and sharpening the second electric pulses transmitted from the fuel flow sensor; an MOS integrated circuit including means for counting separately said first and second shaped electric pulses over selected periods, gating means to direct the two counts into said calculating means and means to activate the calculating means; driver means for transmitting the results of the calculation to display and display means to depict said results of fuel consumption rate.

12. The apparatus of claim 11, having a counter reset means to reset the counter means to zero to permit new counts and new calculations to be periodically made to repeatedly update the display of said results.

13. The apparatus of claim 11, having second paths for said first and second shaped electric pulses in said MOS circuit; means for accumulating the counts of said first and second pulses; means to activate the calculator means to calculate the average fuel consumption rate of said vehicle and calculator reset means to reactivate the calculator means based on the latest counts to update the average figures displayed.

14. The apparatus of claim 1 having a first pulse shaper for slicing and sharpening said distance pulses; a second pulse shaper for slicing and sharpening said fuel flow pulses; means for transmitting the shaped distance pulses to an MOS integrated circuit which includes a distance counter, interface circuit means and calculator means; a first gating circuit means to gate the distance count through said interface circuit means to said calculator means and an MPG sequencer connected to said gating and interface means for controlling said gating circuit means; means for transmitting the shaped fuel flow pulses to said MOS integrated circuit which includes a fuel flow counter, a sequence control which is connected to said MPG sequencer to periodically activate the latter and thus said calculating means and a secondary gating circuit means to gate the fuel flow count through said interface circuit means to said calculator means to compute the ratio of the two counts for a selected period; display means to depict the calculated fuel consumption per distance traveled and display driver means to power said display means.

15. The apparatus of claim 14 having a counter reset means which resets the distance counter and the fuel flow counter to zero, said MPG sequencer activating said calculator after a selected period to obtain on said display the current fuel consumption rate of the vehicle.

16. The apparatus of claim 14 having an average MPG sequencer which signals said display driver to disable said display, said gating means serving to gate the most recent selected accumulated distance counts and fuel flow counts to said calculator means to compute the ratio of the two counts for the period desired to provide the average fuel consumption rate of the vehicle.

17. The apparatus of claim 14 having an electrical odometer, including a distance counter connected to said first pulse shaper; an encoder means to encode the count; gating means connected to said distance counter to direct the count therefrom to said encoder means and a display driven by said encoder means to display the distance traveled in connection with the fuel consumption display.

18. A fuel consumption measuring apparatus for engines comprising; a clock means which outputs electric time pulses, the number thereof in proportion to a period of operation of said engine; a fuel flow sensor connected to the fuel system for said engine which produces electric signals, the number thereof in proportion to the per unit fuel flow therein; counter means to count separately the time pulses and the fuel flow pulses over selected intervals and calculating means to compute the ratio of the two counts for a selected interval to obtain the fuel consumption per unit time rate for said engine.

19. The apparatus of claim 18 being set to calculate the fuel consumption rate in gallons per hour.

20. The apparatus of claim 18 having a first pulse shaper for slicing and sharpening the electric pulses transmitted from the clock means and a second pulse shaper for slicing and sharpening the electric pulses from the fuel flow sensor, means for transmitting the time pulses and the fuel flow pulses to an MOS processor for counting, gating, sequencing and calculating said pulses, said MOS processor having, a counting means for counting separately the time and fuel flow pulses over selected periods, calculating means, gating means to direct the two counts into said calculating means, a sequencer for activating said gating means and thus said calculating means to compute the ratio of said counts for a selected period, display means to depict the calculated fuel consumption per unit time and display driver means to power said display means.

21. The apparatus of claim 20 having a current counting, calculating and display means to depict the current fuel consumption rate and having an average counting, calculating and display means to depict the average fuel consumption rate over a selected period.

22. A method for measuring fuel consumption in vehicle comprising; sensing the distance traveled by said vehicle and outputting a signal therefrom in the form of a plurality of electric pulses, the number thereof in proportion to the distance traveled by said vehicle; sensing the fuel flow rate in said vehicle and outputting a signal therefrom in the form of a plurality of electric pulses, the number thereof in proportion to the per unit fuel flow therein; counting separately the distance pulses and the fuel flow pulses over a selected time period and calculating the ratio of the two counts for a selected time period to obtain the fuel consumption per distance rate for said vehicle.

23. A method for measuring fuel consumption in an engine comprising; timing the period over which said engine is operating and outputting a signal therefrom in the form of a plurality of electric pulses, the number thereof in proportion to a period of operation of said engine; sensing the fuel flow rate in said engine and outputting a signal therefrom in the form of a plurality of electric pulses, the number thereof in proportion to the per unit fuel flow therein; counting separately the time pulses and the fuel flow pulses over selected intervals and calculating the ratio of the two counts for a selected interval to obtain the fuel consumption per uint time rate for said engine.

* * * * *